United States Patent
Kim et al.

(10) Patent No.: US 9,242,645 B2
(45) Date of Patent: Jan. 26, 2016

(54) FAIL-SAFE CONTROL METHOD FOR ENGINE CLUTCH ACTUATOR AND APPARATUS THEREOF

(71) Applicant: Hyundai Motor Company, Seoul (KR)

(72) Inventors: Tae Ho Kim, Seoul (KR); Jong Hyun Kim, Suwon-si (KR); Young Chul Kim, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 50 days.

(21) Appl. No.: 14/108,037

(22) Filed: Dec. 16, 2013

(65) Prior Publication Data

US 2015/0112529 A1    Apr. 23, 2015

(30) Foreign Application Priority Data

Oct. 22, 2013    (KR) .................. 10-2013-0125847

(51) Int. Cl.
*B60W 20/00*    (2006.01)

(52) U.S. Cl.
CPC ............ *B60W 20/50* (2013.01); *Y10S 903/902* (2013.01)

(58) Field of Classification Search
None
See application file for complete search history.

(56) References Cited

U.S. PATENT DOCUMENTS

| 8,364,385 B2 | 1/2013 | Buslepp et al. |
| 2010/0075798 A1* | 3/2010 | Suzuki .................. B60W 20/00 477/5 |
| 2014/0041986 A1* | 2/2014 | Ruehle ................ F16H 63/3416 192/220.2 |

FOREIGN PATENT DOCUMENTS

| JP | 2007-015679 A | 1/2007 |
| KR | 10-2007-0059477 A | 6/2007 |
| KR | 10-2008-0113568 A | 12/2008 |
| KR | 10-2009-0013872 A | 2/2009 |
| KR | 10-2009-0040930 A | 4/2009 |
| KR | 10-2010-0034709 A | 4/2010 |
| KR | 10-2010-0056943 A | 5/2010 |
| KR | 10-2013-0051702 A | 5/2013 |

\* cited by examiner

*Primary Examiner* — John R Olszewski
*Assistant Examiner* — David Merlino
(74) *Attorney, Agent, or Firm* — McDermott Will & Emery LLP

(57) ABSTRACT

A fail-safe control method and apparatus for an engine clutch actuator includes determining whether a driving mode of a hybrid vehicle is an electric vehicle (EV) mode. An oil pressure in a cylinder of the engine clutch actuator is measured when the driving mode of the hybrid vehicle is the EV mode. The oil pressure value in the cylinder is compared with a previously stored average pressure value. A motor of the engine clutch actuator rotates to decrease the oil pressure value in the cylinder t when the oil pressure value in the cylinder is greater than the previously stored average pressure value. An engine clutch is connected to an internal combustion engine as the oil pressure value in the cylinder decreases.

2 Claims, 4 Drawing Sheets

FAIL-SAFE CONTROL METHOD FOR ENGINE CLUTCH ACTUATOR AND APPARATUS THEREOF

CROSS-REFERENCE TO RELATED APPLICATION

This application claims under 35 U.S.C. §119(a) the benefit of priority to Korean Patent Application No. 10-2013-0125847 filed Oct. 22, 2013, the entire contents of which are incorporated herein by reference.

TECHNICAL FIELD

The present disclosure relates to a fail-safe control method for an engine clutch actuator and an apparatus thereof. More particularly, the present disclosure relates to a fail-safe control method for an engine clutch actuator of a hybrid vehicle by controlling an oil pressure of a cylinder, and an apparatus thereof.

BACKGROUND

A hybrid vehicle is a next generation vehicle which reduces exhaust gas emissions and provides efficient gas mileage by employing motor power as well as internal combustion engine power.

Generally, as shown in FIG. 4, in the hybrid vehicle, an engine 10, a motor 20, and an automatic transmission 30 are arranged in series. The engine 10 and the motor 20 are connected to each other to transfer power via an engine clutch 40.

The hybrid vehicle can drive in two different modes which may be classified as an electric vehicle (EV) mode using only a motor power of the motor 20, and a hybrid electric vehicle (HEV) mode using torque of the engine 10 as a main power and torque of the motor 20 as an auxiliary power.

The engine clutch actuator of a dual clutch transmission (DCT) employed in the hybrid vehicle transfers hydraulic pressure required for coupling or releasing the engine clutch by converting the torque generated from the motor into rectilinear movement.

When the hybrid vehicle is driven in the EV mode and while the actuator operates according to a characteristic of a normally closed type clutch, the clutch is released so that the motor can be used as the main power source.

However, the engine clutch actuator installed in the hybrid vehicle according to the related art can only sense pressure of a cylinder and a reservoir by using a pressure sensor, and supplements brake oil by driving a piston without having any additional fail-safe strategy.

Therefore, in the hybrid vehicle according to the related art, when the engine clutch actuator fails to operate, the rectilinear movement of the piston ceases, thus making it difficult to switch from the EV mode to the HEV mode in the hybrid vehicle. In addition, when the engine clutch actuator does not operate during the EV mode, power consumption increases to maintain the EV mode since the EV mode is forced to operate, thereby deteriorating the fuel efficiency.

SUMMARY

The present disclosure provides a fail-safe control method for an engine clutch actuator capable of returning again from an electric vehicle (EV) mode to a hybrid electric vehicle (HEV) mode even though the engine clutch actuator is broken down in the EV mode.

A fail-safe control method for an engine clutch actuator according to an exemplary embodiment of the present disclosure includes determining whether a driving mode of a hybrid vehicle is an electric vehicle (EV) mode. An oil pressure in a cylinder of the engine clutch actuator is measured when the driving mode of the hybrid vehicle is the EV mode. An oil pressure value in the cylinder is compared with a previously stored average pressure value. A motor of the engine clutch actuator rotates to decrease the oil pressure value in the cylinder when the oil pressure value in the cylinder is greater than the previously stored average pressure value. An engine clutch is connected to an internal combustion engine as the oil pressure value in the cylinder decreases.

The engine clutch includes a dry friction clutch.

A fail-safe control method for an engine clutch actuator according to another embodiment of the present disclosure includes determining whether a driving mode of a hybrid vehicle is an electric vehicle (EV) mode. An oil pressure value in a master cylinder of the engine clutch actuator is measured when the driving mode of the hybrid vehicle is the EV mode. The oil pressure value in the master cylinder is added to a previously stored average pressure value to obtain a new average pressure value. The new average pressure value is substituted for the previously stored average pressure value.

A fail-safe control apparatus for an engine clutch actuator according to another embodiment of the present disclosure includes a pressure sensor to measure a pressure value in a cylinder of the engine clutch actuator. A local controller determines whether a driving mode of a hybrid vehicle should be in either an electric vehicle (EV) mode or a hybrid electric vehicle (HEV) mode by comparing the pressure value measured by the pressure sensor with an average pressure value of the cylinder in the EV mode. A motor rotates according to a command of the local controller in order to control a pressure of the cylinder to connect an engine clutch to or release the engine clutch from an internal combustion engine.

The engine clutch includes a dry friction clutch.

The average pressure value of the cylinder in the EV mode is obtained by averaging pressure values of the cylinder measured during a previously stored period of time while the hybrid vehicle is driven in the EV mode.

The fail-safe control method for an engine clutch actuator according to the present disclosure has the following advantages:

When the hybrid vehicle does not operate normally while being driven in the EV mode, an error of the hybrid vehicle may be sensed, and the hybrid vehicle may be capable of driving in the HEV mode, thus reducing the power consumption by maintaining the vehicle in the EV mode, thereby improving the fuel mileage.

Further, when the engine clutch is out of order in the EV mode, the motor of the engine clutch actuator reversely rotates, so that the hybrid vehicle can be driven in the HEV mode, and thus, a fail-safe control may be established only with a simple structure.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
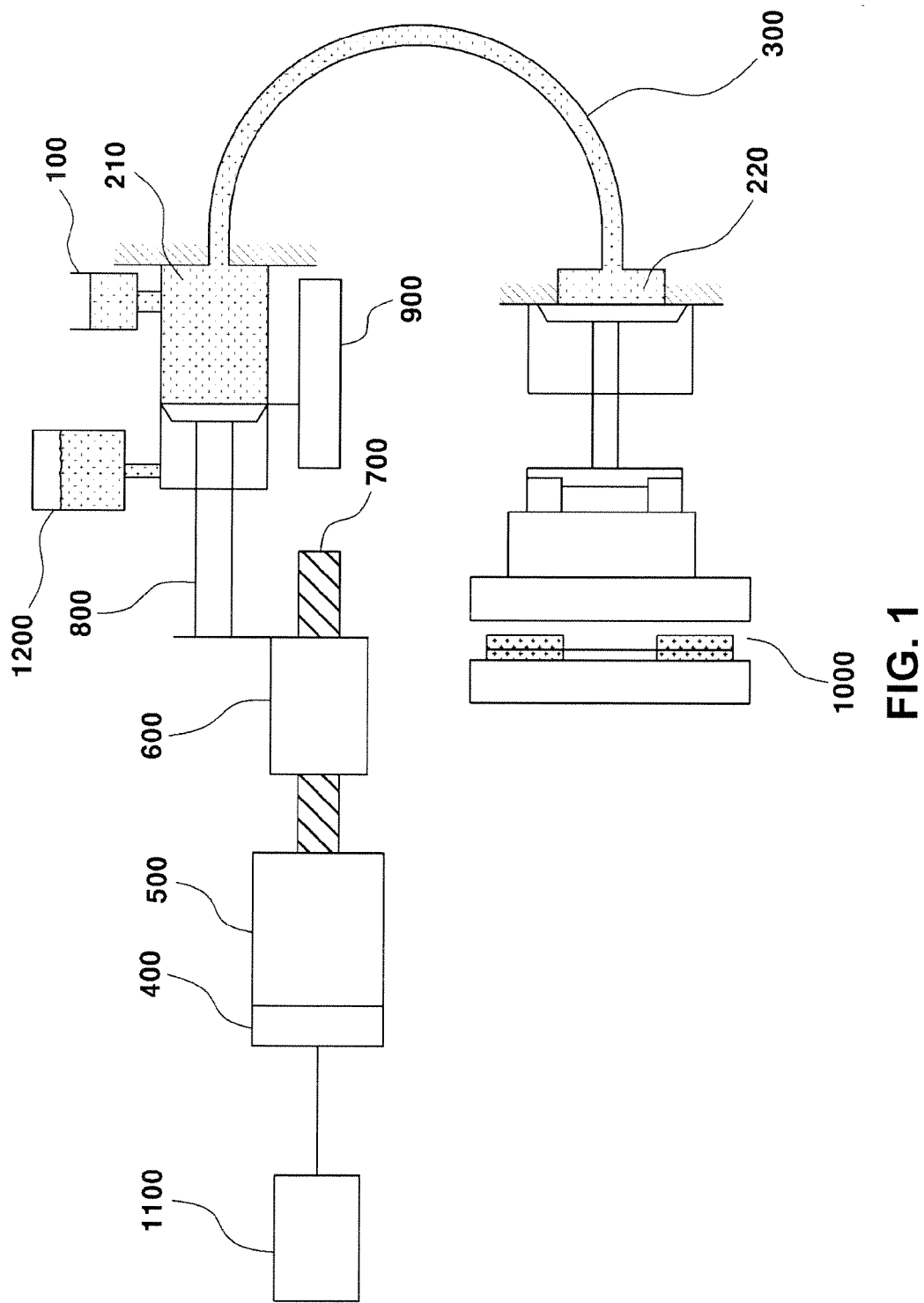
FIG. 1 is a block diagram showing a configuration of an engine clutch actuator according to an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and environment.

In the figures, reference numbers refer to the same or equivalent parts of the present disclosure throughout the several figures of the drawing.

DETAILED DESCRIPTION

Hereinafter, the present disclosure will be described in detail with reference to the accompanying drawings.

FIG. 1 is a block diagram showing a configuration of an engine clutch actuator according to an embodiment of the present disclosure.

The engine clutch actuator according to an embodiment of the present disclosure may include a pressure sensor 100 for measuring a pressure of a master cylinder 210, a slave cylinder 220 connected to the master cylinder 210 through a duct 300, an local control unit (LCU) 400 for instructing a motor of the engine clutch actuator to be rotated normally or in reverse, and a motor 500 operated according to the instruction of the LCU 400. A screw 700 rotates as the motor 500 rotates, and a nut 600 moves along a screw thread of the screw 700. A piston 800 applies or releases a pressure to or from cylinder oil in the engine clutch actuator. A reservoir 1200 injects oil into the cylinder, and a trouble sensor 900 measures a position of the piston 800 in the cylinder. A hybrid control unit (HCU) 1100 determines whether the driving mode of the hybrid vehicle should be in either an electric vehicle (EV) mode or a hybrid electric vehicle (HEV) mode.

A process of operating the engine clutch actuator according to an embodiment of the present disclosure will be described below.

When the mode of a vehicle is switched to the EV mode, that is a pure electric vehicle mode, while the vehicle is being driven in the HEV mode, the HCU 1100 may transfer a signal to the LCU 400 to inform the LCU 400 about the switching from the HEV mode to the EV mode. Once the LCU 400 receives the signal, the LCU 400 may separate the clutch 1000 from an internal combustion engine.

The LCU 400 may provide a normal rotation command to the motor 500 of the engine clutch actuator. As the motor 500, which receives the normal rotation command, rotates, the screw 700 connected to a driving shaft of the motor 500 rotates together with the shaft. The nut 600 moves forward along the screw thread of the screw 700 in a direction to which the piston is pushed. The normal rotation may be a clockwise or counterclockwise rotation direction of the motor, but the present disclosure is not limited thereto. The normal rotation is a rotational direction in which the piston presses the cylinder oil in the engine clutch actuator as the nut 600 moves forward along the screw thread of the screw 700. When the motor 500 is reversely rotated, the nut 600 moves back (to a left direction in FIG. 1) along the screw thread of the screw 700 to release the pressure applied to the cylinder oil in the engine clutch actuator.

When the piston 800 moves ahead (to a right direction in FIG. 1), pressure may be applied to the cylinder oil in the cylinder 210. As the pressure is applied to the oil in the master cylinder 210, the oil in the master cylinder 210 may flow into the slave cylinder 220 through the duct 300. The slave cylinder 220 is filled with the oil, presses a release fork of the clutch, and separates the clutch from the engine. The motor of the vehicle is operated, thus switching the hybrid vehicle into the EV mode.

In order to switch from the EV mode to the HEV mode, the above described process may perform in reverse order. The HCU 1100 of the engine clutch actuator may instruct the LCU 400 to switch to the HEV mode, so that the LCU 400 may instruct the motor 500 to rotate in reverse in response to the instruction. Since the motor 500 rotates in the reverse order, the nut 600 may move down along the screw thread of the screw 700. As the nut 600 moves down along the screw thread of the screw 700, the piston 800 may move down together with the nut 600 so as to decrease the pressure in the master cylinder 210. As the pressure of the master cylinder 210 is deceased, the oil of the slave cylinder 220 flows again into the master cylinder 210 through the duct 300. The pressure applied to the release fork is released, and the clutch 1000 is again coupled to the engine, thus switching to the HEV mode.

According to the related art, if the engine clutch actuator does not operate normally in the EV mode, the EV mode is compulsorily maintained due to the characteristics of the hybrid vehicle using the normally closed type clutch. As the result, the amount of power consumed by the hybrid vehicle is increased, and the fuel efficiency may be deteriorated. In the present disclosure, the engine clutch actuator may not operate normally in the EV by a logical defect rather than a physical defect. Although a high-level control instructs the HCU to switch from the EV mode to the HEV mode, the mode switching may not operate normally.

Thus, according to the fail-safe control method for an engine clutch actuator according to an exemplary embodiment of the present disclosure, the fail-safe control method may prepare the logical defect by which the engine clutch actuator does not operate normally when switching from the EV mode to the HEV mode.

Figure 2:
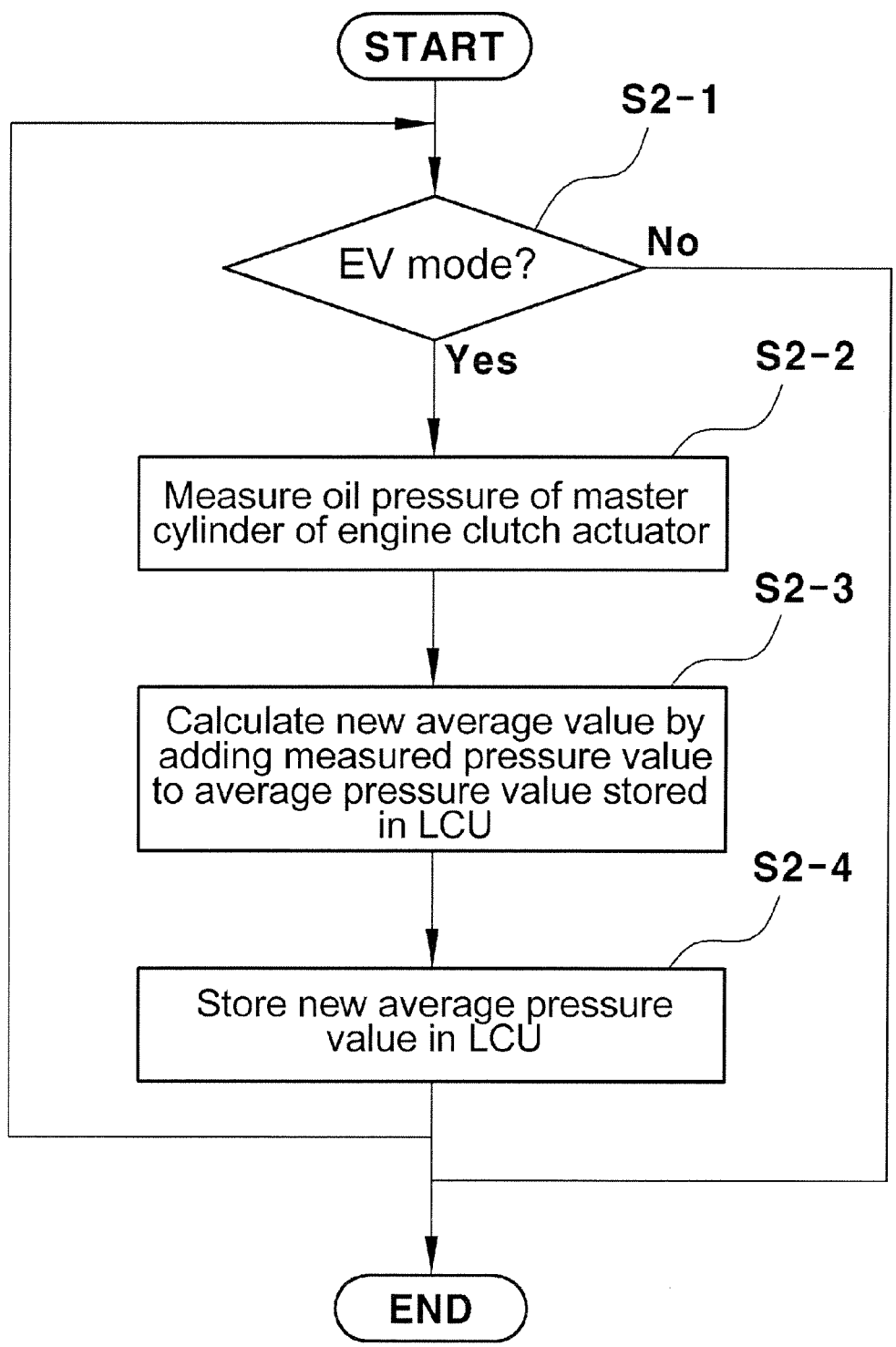
FIG. 2 is a flowchart illustrating a method of calculating a reference value for determining whether an engine clutch actuator is out of order in a fail-safe control method for an engine clutch actuator according to an embodiment of the present disclosure.

FIG. 2 is a flowchart illustrating a method of calculating a reference value for determining whether an engine clutch actuator is out of order in a fail-safe control method according to an embodiment of the present disclosure.

When the vehicle, to which the fail-safe control method for an engine clutch actuator according to an embodiment of the present disclosure is applied, is being driven, a controller may perform step S2-1 of determining whether the vehicle is operated in the EV mode or the HEV mode. Step S2-1 may be performed by the HCU 1100 or any other controllers, and thus, the embodiment is not limited thereto. If the vehicle is operated in the HEV mode, the vehicle is continuously operated in the HEV mode. A cylinder pressure of the engine clutch actuator, which is a reference value used for determining whether the engine clutch actuator is out of order, may not be measured. However, when the vehicle is operated in the EV mode, the vehicle may measure an oil pressure of the master cylinder 210 of the engine clutch actuator using the pressure sensor 100 installed inside the master cylinder 210 in step S2-2. However, measuring the pressure of the master cylinder 210 may not be necessary if it is possible to determine whether the cylinder pressure of the engine clutch actuator is increased based on any other pressures. That is, the pressure sensor 100 may be installed at any location to determine whether the cylinder pressure of the engine clutch actuator is increased.

When the pressure sensor 100 measures the pressure in the cylinder, step S2-3 calculates a new average pressure value by adding the measured pressure value to the previous stored pressure in the LCU 400. The previous average pressure value may be a factory set initial value and stored in the LCU 400. In addition, a suitable value to determine whether the engine clutch actuator is out of order while the vehicle is being driven may be the factory set initial value or may be selected through repeated experiments. According to the step S2-3, the pressure value measured by the pressure sensor 100 and the previous average value stored in the LCU 400 are added and divided by two to obtain the new average value. On the other hand, the LCU 400 may memorize the order of measurements repeatedly performed by the pressure sensor 100. Then, the new average value may be obtained by adding all values measured by the pressure sensor 100 and dividing by the number of the measurements. However, the embodiment is not limited thereto, and various methods may be selected. Although the new average pressure value is obtained either by a simple calculation of the arithmetic mean of the previous average pressure value and the measurement value; and dividing the value obtained by adding all of the repeatedly measured values by the number of measurements, the two calculated values gradually approach to each other.

The LCU 400 may perform step S2-4 of storing the new average pressure value in the LCU 400. The new average pressure value may be stored in an internal memory of the LCU 400 or an additionally prepared memory. However, the embodiment is not limited thereto, and if read out from the stored memory value, it does not matter where the new average pressure value is stored.

When the new average pressure value, which serves as a new trouble determination reference, is stored in the LCU 400, a trouble reference may not need to be obtained. However, while the vehicle is in the EV mode, the steps of obtaining the average pressure value may repeat during a period of time. Since the steps are continuously repeated, the average pressure value may continuously vary. In addition, when the driving mode of the vehicle switches from the EV mode to the HEV mode, the step of obtaining the average pressure value of the cylinder in the engine clutch actuator may be terminated.

Figure 3:
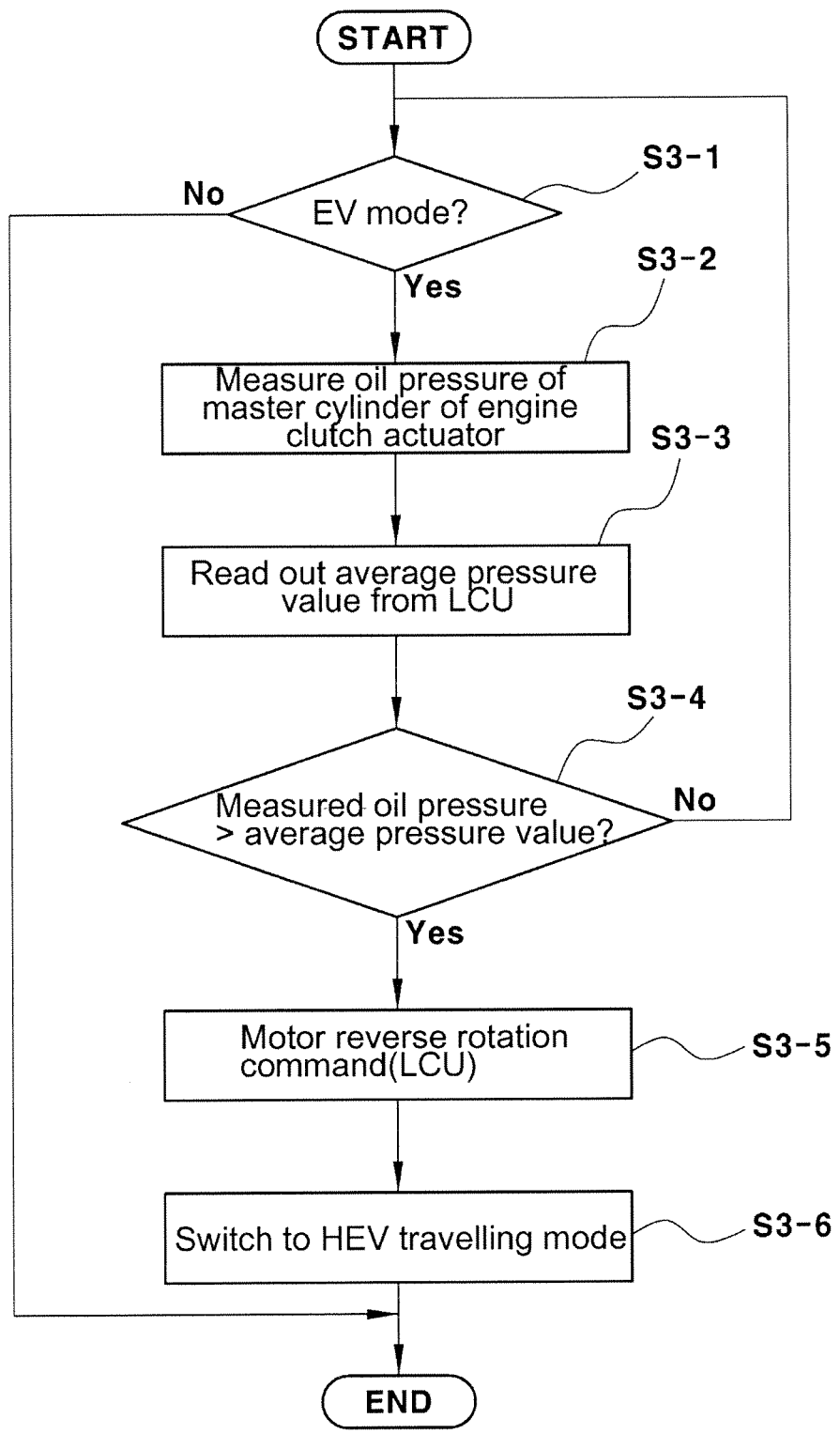
FIG. 3 is a flowchart illustrating a fail-safe control method for an engine clutch actuator according to an embodiment of the present disclosure.
Figure 4:
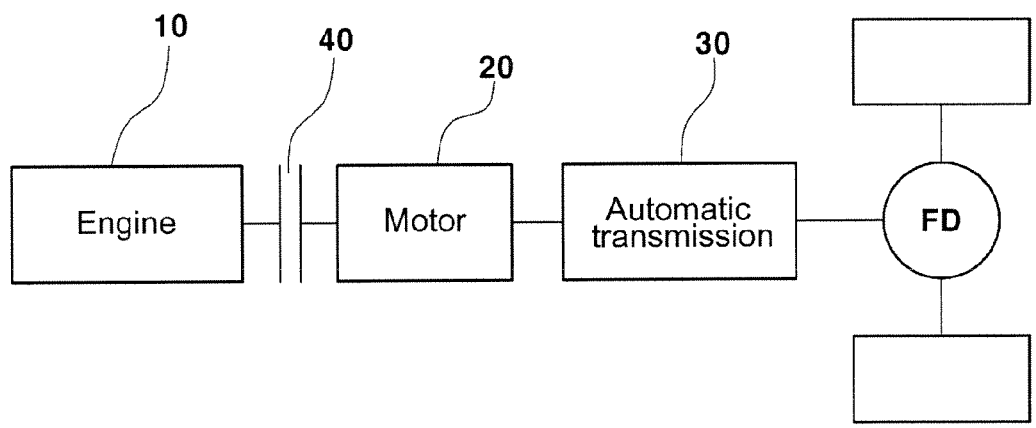
FIG. 4 is a block diagram showing a connection relation between an engine, a motor, and a clutch of a hybrid vehicle according to the related art.

FIG. 3 is a flowchart illustrating a fail-safe control method for an engine clutch actuator according to an embodiment of the present disclosure.

Once the vehicle starts to move, the HCU 1100 may determine whether the driving mode of the vehicle is the HEV mode or the EV mode in step S3-1.

When the vehicle is in the HEV mode, without performing the step of determining whether the engine clutch actuator is out of order, the HCU 1100 may immediately terminate the process.

However, when the vehicle is in the EV mode, the engine clutch actuator according to an embodiment of the present disclosure may measure the oil pressure in the cylinder of the engine clutch actuator in step S3-2. In this step of measuring the oil pressure in the master cylinder 210, the oil pressure may be measured by the pressure sensor 100.

After measuring the cylinder pressure, the fail-safe control method for an engine clutch actuator according to an embodiment of the present disclosure may obtain the average pressure value from the LCU 400 in step S3-3. In this case, the average pressure value obtained from the LCU 400 may be determined through the step of calculating the new average pressure value which serves as the trouble determination reference of FIG. 2, as described above.

When the average pressure value is obtained from the LCU 400, the pressure value measured by the pressure sensor 100 is compared with the average value read out from the LCU 400 in step S3-4. In this step, if the measured oil pressure value is less than the average value obtained from the LCU 400, it may be determined that the engine clutch actuator according to an embodiment of the present disclosure is operated normally. In order to measure a new pressure value when the vehicle is travelling in the EV mode, the pressure sensor 100 may perform measure the pressure in the cylinder in step S3-2.

However, if the pressure value measured by the pressure sensor 100 is greater than the average value obtained from the LCU 400, the LCU 400 may instruct the motor 500 to rotate in a reverse direction in step S3-5. As the motor 500 rotates in reverse, the nut 600 moves down along the screw thread of the screw 700 so that the piston may move backward. As a result, the pressure in the master cylinder 210 of the engine clutch actuator according to an embodiment of the present disclosure may decrease.

As the pressure of the master cylinder 210 decreases, the driving mode of the vehicle switches from the EV mode to the HEV mode. Since the pressure in the master cylinder 210 of the engine clutch actuator according to an embodiment of the present disclosure decreases, the oil in the slave cylinder 220 may flow into the master cylinder 210 through the duct 300. In addition, the decrease pressure of the slave cylinder 220 may release the pressure applied to the release fork of the clutch 1000. While the pressure of the release fork is released, the clutch 1000 is coupled to the engine so that the vehicle is driven in the HEV mode.

When the driving mode of the vehicle is the EV mode, the fail-safe control method may repeat during a period of time. Further, the fail-safe control method and the process of obtaining the average pressure value, which serves as a trouble determination reference, of FIG. 2 may be simultaneously performed.

According to the fail-safe control method for an engine clutch actuator according to an embodiment of the present disclosure, when the oil pressure of the master cylinder 210 exceeds the reference pressure, it may be determined that the engine clutch actuator, which controls the driving mode, is out of order, and thus, the current consumption due to the over-travelling in the EV mode may be reduced.

As described above, the fail-safe control method for an engine clutch actuator according to an embodiment of the present disclosure has been described assuming that the fail-safe control method for an engine clutch actuator is applied to a dry friction clutch, but the embodiment is not limited thereto. In addition, the embodiment may be applied to any clutch that has a similar problem.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A fail-safe control method for an engine clutch actuator, the method comprising:
   determining whether a driving mode of a hybrid vehicle is an electric vehicle (EV) mode;

measuring an oil pressure in a cylinder of the engine clutch actuator when the driving mode of the hybrid vehicle is the EV mode;

comparing an oil pressure value in the cylinder with a previously stored average pressure value;

rotating a motor of the engine clutch actuator to decrease the oil pressure value in the cylinder when the oil pressure value in the cylinder is greater than the previously stored average pressure value; and connecting an engine clutch to an internal combustion engine as the oil pressure value in the cylinder decreases.

2. The fail-safe control method of claim 1, wherein the engine clutch includes a dry friction clutch.

* * * * *